United States Patent
Namkoong et al.

(10) Patent No.: US 8,325,434 B2
(45) Date of Patent: Dec. 4, 2012

(54) METHOD AND APPARATUS FOR PRESERVING DATA OF A STORAGE DEVICE

(75) Inventors: Yun Namkoong, Suwon-si (KR); Gyu Taek Kim, Seoul (KR); Ho-Youl Kim, Suwon-si (KR)

(73) Assignee: Seagate Technology LLC, Cupertino, CA (US)

( * ) Notice: Subject to any disclaimer, the term of this patent is extended or adjusted under 35 U.S.C. 154(b) by 112 days.

(21) Appl. No.: 12/766,436

(22) Filed: Apr. 23, 2010

(65) Prior Publication Data

US 2010/0271727 A1   Oct. 28, 2010

(30) Foreign Application Priority Data

Apr. 24, 2009   (KR) .................. 10-2009-0035777

(51) Int. Cl.
*G11B 5/09*   (2006.01)
*G11B 27/36*   (2006.01)
*G11B 15/04*   (2006.01)
*G11B 19/04*   (2006.01)

(52) U.S. Cl. .................. 360/48; 360/31; 360/60
(58) Field of Classification Search .................. None
See application file for complete search history.

(56) References Cited

U.S. PATENT DOCUMENTS

| | | | |
|---|---|---|---|
| 7,345,837 B1 | 3/2008 | Schreck et al. | |
| 2004/0151078 A1* | 8/2004 | Katsuya | 369/13.11 |
| 2006/0245102 A1 | 11/2006 | Cheng | |
| 2008/0174905 A1* | 7/2008 | Ueda | 360/77.04 |

FOREIGN PATENT DOCUMENTS

| | | |
|---|---|---|
| JP | 2006-179102 A | 7/2006 |
| KR | 10-0630745 B1 | 9/2006 |

* cited by examiner

*Primary Examiner* — Regina N Holder
(74) *Attorney, Agent, or Firm* — Cesari & Reed, LLP; Kirk A. Cesari

(57) ABSTRACT

A method is disclosed for preserving data in a hard disk drive, in which data loss due to adjacent track erase (ATE) phenomenon can be minimized by relocating data, which is written in a zone where the ATE phenomenon is likely to occur since frequency of use is high, to another zone having a low TPI when writing the data in a disk.

19 Claims, 4 Drawing Sheets

METHOD AND APPARATUS FOR PRESERVING DATA OF A STORAGE DEVICE

CROSS-REFERENCE TO RELATED APPLICATIONS

This application claims priority from Korean Patent Application No. 10-2009-0035777, filed on Apr. 24, 2009, in the Korean Intellectual Property Office, the disclosure of which is incorporated herein by reference.

SUMMARY

The inventive concept relates to a method and apparatus for preserving data of a hard disk drive, and more particularly, to a method and apparatus for preserving data of a hard disk drive, which can minimize data loss due to adjacent track erase (ATE) phenomenon.

Hard disk drives have recently increased data storage capacity. Track per inch (TPI), which represents track density of a disk, has also shown a large increase based on the increased storage capacity of the disk drive.

The TPI is set up according to zones of the disk, depending on writing and reading performance of the disk through a predetermined test of the hard disk drive in a manufacturing process. The higher the TPI of a zone, the narrower the width of the track included in the zone.

The hard disk drive employs a magnetic writing method. As a result, an adjacent track erase (ATE) phenomenon may occur. The ATE phenomenon is that if data is repetitively written in one position, a magnetic field affects tracks adjacent to the one position and thus data written in the adjacent tracks may be erased.

The ATE phenomenon is likely to occur at a narrower width of the track. Recently, the ATE has been a serious problem as the width of the track decreases with high TPI.

The exemplary embodiments provide a method and apparatus for preserving data of a hard disk drive, which can minimize data loss due to adjacent track erase (ATE) phenomenon.

According to an aspect of the exemplary embodiments, there is provided a method and apparatus for preserving data in a hard disk drive, the method including: when receiving a writing command, searching a lookup table where a number of writing times are recorded according to logical block addresses (LBA); relocating data by moving data written in a target sector to an allocated sector, if the number of writing times of the LBA for assigning the target sector for writing in response to the writing command exceeds a predetermined number of writing times as a result of searching the lookup table; and rearranging the LBA to interchange the LBA for assigning the target sector with the LBA for assigning the allocated sector.

The allocated sector may be included in a previously allocated zone to have a track per inch (TPI) lower than an average TPI on a disk.

The previously allocated zone may be set up as a whole or a part of a zone having a lowest TPI among a plurality of zones on the disk.

The allocated sector may include a larger track width than the target sector.

The method may further include increasing the number of writing times of the LBA for assigning the target sector by one in the lookup table if the number of writing times of the LBA for assigning the target sector for writing in response to the writing command does not exceed the predetermined number of writing times as a result of searching the lookup table.

The method may further comprise adding the LBA for assigning the target sector to the lookup table if the lookup table comprises no LBA for assigning the target sector as a result of searching the lookup table.

The relocating the data may further comprise moving the data written in the target sector to the allocated sector, and moving the data written in the allocated sector to the target sector.

The lookup table may be stored in a disk and uploaded from the disk to a buffer, and the searching the lookup table may comprise searching the lookup table uploaded to the buffer.

As described above, according to the exemplary embodiments, data loss due to adjacent track erase (ATE) phenomenon is minimized by relocating data, which is written in a zone where the ATE phenomenon is likely to occur since frequency of use is high, to another zone having a low TPI when writing the data in a disk.

According to another aspect of the exemplary embodiment, an apparatus for preserving data in a hard disk drive is provided. The apparatus includes a host interface receiving a writing command from a user input; a lookup table; a controller searching the lookup table where a number of writing times is recorded according to logical block addresses (LBA) when receiving a writing command; said lookup table including LBA for assigning an allocation sector; said controller relocating data to move data written in a target sector of a disk to an allocated sector of said disk if the number of writing times of the LBA for assigning the target sector for writing in response to the writing command exceeds a predetermined number of writing times as a result of searching the lookup table; and said controller rearranging the LBA to interchange the LBA for assigning the target sector with the LBA for assigning the allocated sector.

BRIEF DESCRIPTION OF THE DRAWINGS

The exemplary embodiments will be more clearly understood from the following detailed description taken in conjunction with the accompanying drawings in which.

DETAILED DESCRIPTION

The attached drawings for illustrating embodiments are referred to in order to gain a sufficient understanding of the exemplary embodiments and the merits thereof.

Hereinafter, the exemplary embodiments will be described in detail by explaining exemplary embodiments with reference to the attached drawings. In the description, well known functions or configurations will be omitted for clarity.

Figure 1:
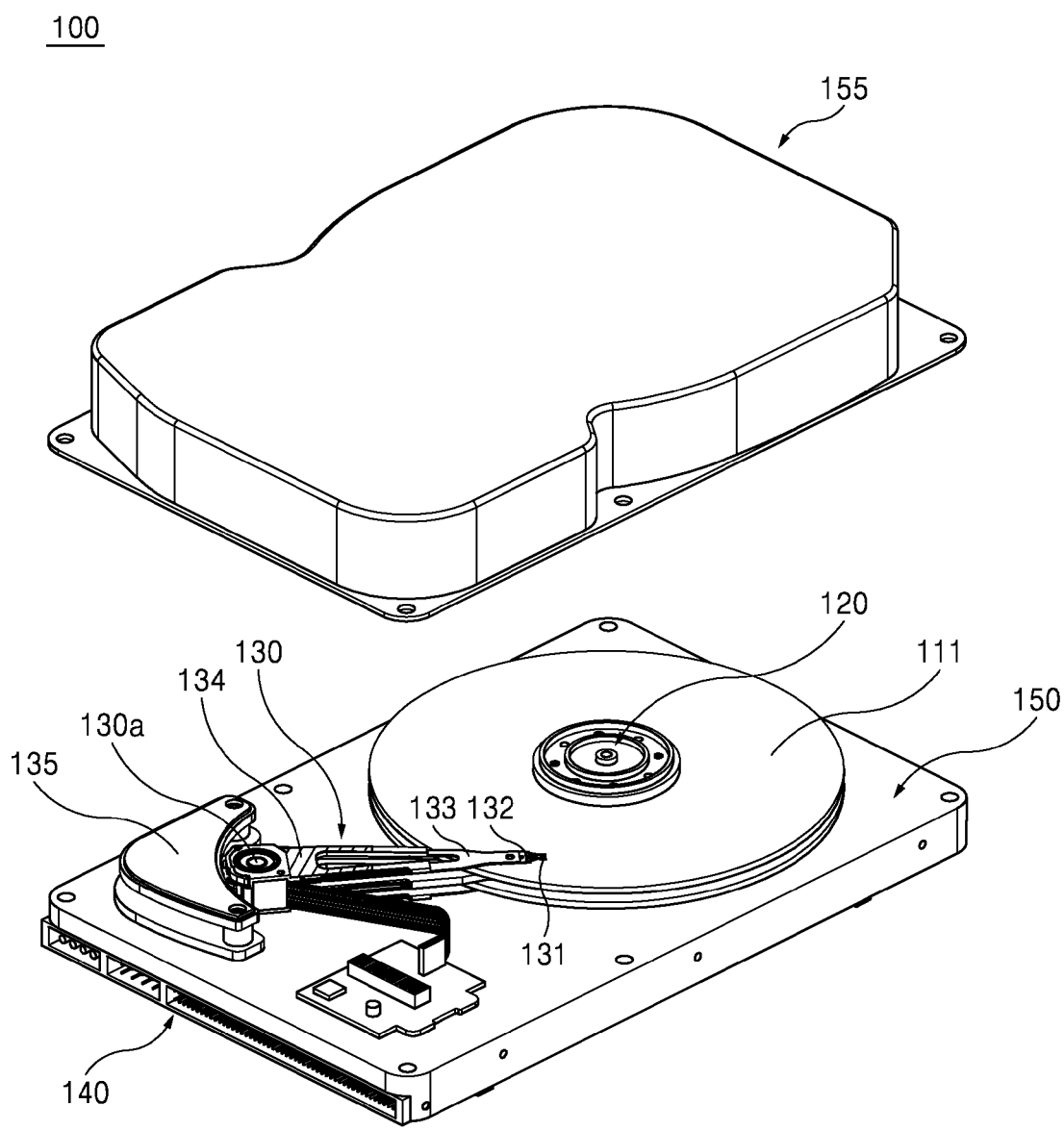
FIG. 1 is a perspective view of a hard disk drive to which a method for preserving data is applied.

FIG. 1 is a perspective view of a hard disk drive to which a method for preserving data is applied.

Referring to FIG. 1, the hard disk drive 100 includes a disk 111 on which data is written, a spindle motor 120 for rotating the disk 111, a head stack assembly (HSA) 130 for writing data or reading the data on the disk 111 while moving on the disk 111 with respect to a pivot shaft 130a, a printed circuit board assembly (PCBA) 140 of which most circuit elements are mounted on a printed circuit board (PCB) and which electrically controls the hard disk drive 100, a base 150 to which the above elements are assembled, and a cover 155 covers the base 150.

As shown in FIG. 1, two disks 111 are stacked up and down on the spindle motor 120. At this time, the two disks 111 are put on and rotatably supported by a hub of the spindle motor 120 as being spaced apart from each other by a ring-shaped spacer (not shown). Alternatively, the hard disk drive in this embodiment may include a single disk 111 or three or more disks 111 for writing more data.

Figure 4:
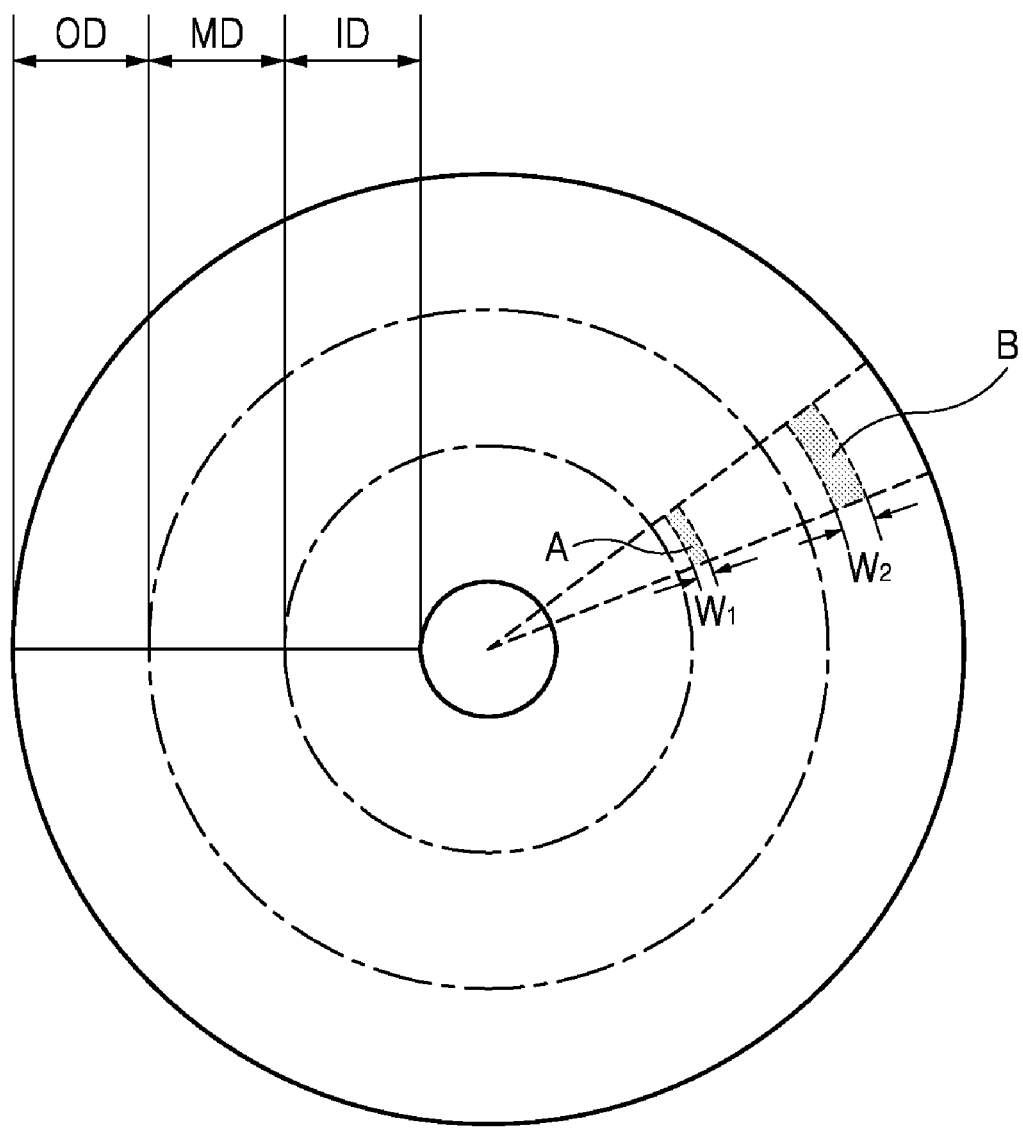
FIG. 4 is a plan configuration view of a disk to explain the method for preserving data using the apparatus.

The disk 111 is partitioned into an inner diameter (ID) zone, a middle diameter (MD) zone, and an outer diameter (OD) zone in order close to the center thereof (refer to FIG. 4). These respective zones include a plurality of annular tracks concentrically provided around the center of the disk 111. Also, the track is divided into sectors as unit objects at equal angles with respect to the center of the disk 111.

Meanwhile, as hard disk drives have recently increased in data storage capacity, a track per inch (TPI) that represents track density of a disk shows a tendency to largely increase.

The TPI is set up according to zones of the disk depending on writing and reading performance of the disk, through a predetermined test in a manufacturing process of the hard disk drive. The higher the TPI of a zone, the narrower the width of the track included in the zone. Further, an adjacent track erase (ATE) phenomenon is likely to occur at a narrower width of the track. In general disk, the TPI of the OD zone is lower than those of other zones (the ID or MD zone).

The HSA 130 includes a magnetic head 131 writing data or reading the data on the disk 111, a slider 132 mounted with the magnetic head 131 and floating the magnetic head 131 on the disk 111, a suspension 133 elastically supporting the slider 132 toward the surface of the disk 111, an actuator arm 134 supporting the suspension 133 and rotatably coupled to the pivot shaft 130*a* so that the magnetic head 131 can approach a requested position on the disk 111, and a voice coil motor (VCM) 135 as an actuator for driving the actuator arm 134 to rotate.

The magnetic head 131 magnetizes the surface of the disk 111 to write data on the disk 111 or sensing a magnetic field on the surface of the disk 111, to read the data from the disk 111. The magnetic head 131 is divided into a writing head for magnetizing the disk 111 and a reading head for sensing a magnetic field of the disk 111, but is illustrated in the accompanying drawing without distinction between reading and writing.

Generally, there are two magnetic heads 131 with respect to one disk 111. The two magnetic heads 131 are arranged while floating at predetermined distances from both top and bottom sides of the disk 111, respectively. In this embodiment, since there are two disks 111, four magnetic heads 131 are arranged while floating from both sides of each disk 111, respectively.

Figure 2:
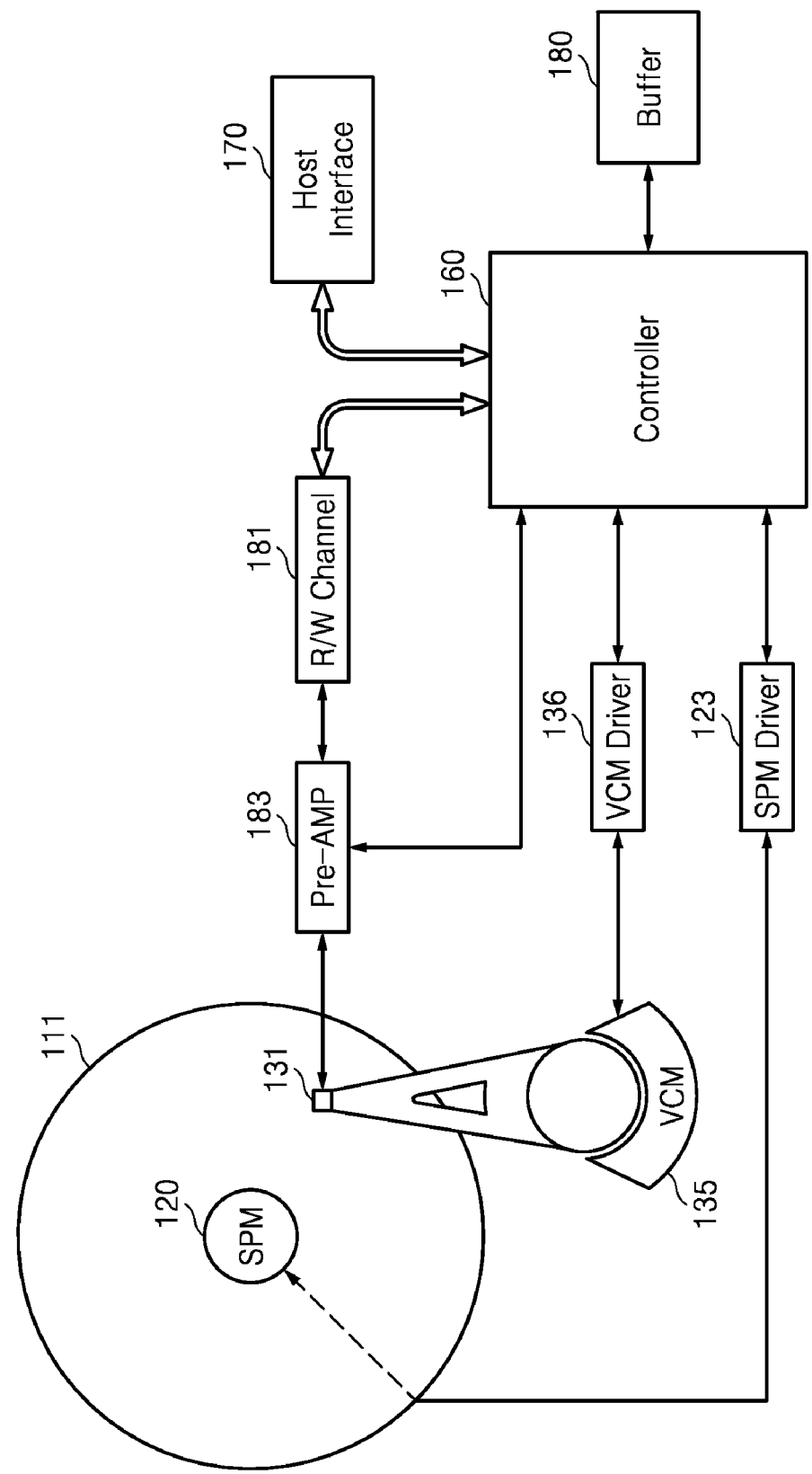
FIG. 2 is a schematic block diagram of a driving circuit for the hard disk drive of FIG. 1.

FIG. 2 is a schematic block diagram of a driving circuit for the hard disk drive of FIG. 1.

Referring to FIG. 2, a controller 160 controls a pre-amplifier (Pre-AMP) 183, a read/write channel (R/W channel) 181, a host interface 170, a VCM driver 136, a spindle motor (SPM) driver 123, a buffer 180, etc.

The pre-amplifier 183 amplifies a data signal read from the disk 111 by the magnetic head 131, or amplifies a writing electric current converted by the read/write channel 181 to be written on the disk 111 through the magnetic head 131.

The read/write channel 181 coverts the signal amplified by the pre-amplifier 183 into a digital signal to be transmitted to a host device (not shown) through the host interface 170, or converts data input by a user and received through the host interface 170 into a binary data stream easy to write to be input to the pre-amplifier 183.

The host interface 170 transmits a digital signal converted based on data to the host device, or receives user input data from the host device and inputs it to the read/write channel 181 via the controller 160. Here, the host device is a general term for elements such as a central processing unit (CPU), an input/output (I/O) controller 160, or the like of a computer that generally controls and operates the whole computer system involving the hard disk drive.

The VCM driver 136 receives a control signal from the controller 160 and adjusts the amount of electric current applied to the VCM 135. The SPM driver 123 receives a control signal from the controller 160 and adjusts the amount of electric current applied to the spindle motor 120.

The buffer 180 temporarily stores data transmitted between the host interface 170 and the controller 160. Generally, the buffer 180 may be achieved by a dynamic random access memory (DRAM) as a volatile memory, but not limited thereto.

The controller 160 receives data, input by a user through the host device, through the host interface 170 and outputs it to the read/write channel 181 in a data writing mode, and receives a digital signal converted based on a read signal by the read/write channel 181 and outputs it to the host interface 170 in a data reading mode. Also, the controller 160 controls the outputs of the VCM driver 136 and the SPM driver 123.

In particular, controller 160 performs a function of preserving data by relocating data, which is written in a zone where the ATE phenomenon is likely to occur since frequency of use is high, to another zone having a low TPI when writing the data in the disk 111.

Specifically, the controller 160 searches a lookup table where the number of writing times is recorded according to logical block addresses (LBA) when receiving a writing command, moves data written in a target sector to an allocated sector if the number of writing times of the LBA to assign the target sector for writing in response to the writing command exceeds a predetermined number of writing times, and interchanges the LBA for assigning the target sector with the LBA for assigning the allocated sector.

More detailed functions of the controller 160 related to the data relocation will be described together with a method for preserving data in the hard disk drive according to the exemplary embodiment.

The controller 160 may include a microprocessor, a microcontroller or the like, or may be achieved in a form of software or firmware.

Below, a method for preserving data in the hard disk drive according to an exemplary embodiment will be described with reference to FIGS. 3 and 4.

Figure 3:
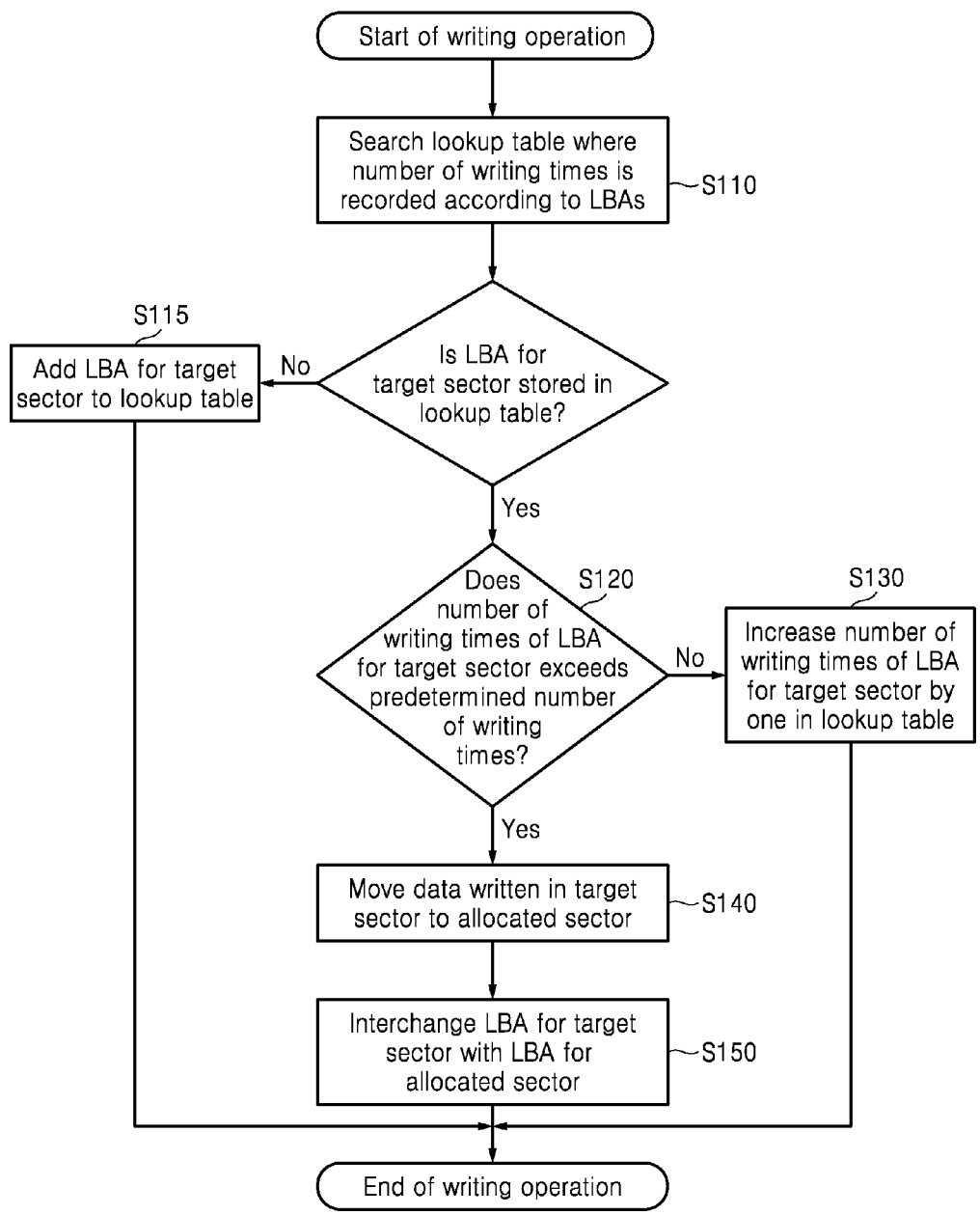
FIG. 3 is a flowchart for explaining a method for preserving data in the hard disk drive according to an exemplary embodiment.

FIG. 3 is a flowchart for explaining a method for preserving data in the hard disk drive according to an exemplary embodiment, and FIG. 4 is a plan configuration view of a disk to explain the method for preserving data.

Referring to FIG. 3, the method for preserving data in the hard disk drive in this embodiment includes a step S110 of searching a lookup table where the number of writing times is recorded according to LBAs, a step S115 of adding an LBA for assigning a target sector to the lookup table, a step S120 of determining whether the number of writing times of the LBA for assigning the target sector exceeds the predetermined number of writing times, a step S130 of increasing the number of writing times of the LBA for assigning the target sector by one in the lookup table, a step S140 of relocating the data to move the data written in the target sector to an allocated sector, and a step S150 of rearranging the LBA to interchange the LBA for assigning the target sector with the LBA for assigning the allocated sector. These steps are generally performed by controller 160.

Here, the 'LBA' means a series of sector numbers allocated to the respective sectors of the disk (e.g., sequentially allocated by giving '0' to the first sector) in logical block addressing as one of methods for assigning the sector address of the disk, in which one LBA assigns one sector on the disk. For reference, most hard disk drives have recently employed the LBA.

When a writing command is input to controller 160 (FIG. 2) and a writing operation starts, step S110 of searching the lookup table where the number of writing times is recorded according to the LBAs, is performed.

The lookup table is stored in a maintenance cylinder of the disk, and uploaded to buffer 180 when the hard disk drive is powered on. That is, the step S110 of searching the lookup table is not to directly search the lookup table stored in the maintenance cylinder of the disk, but to search the lookup table uploaded from the disk to the buffer 180 (FIG. 2). Accordingly, when searching the lookup table, it is possible to omit an operation of causing a processing speed to be lowered with regard to the writing command, i.e., an operation of physically moving the magnetic head to the maintenance cylinder of the disk.

Next, if the lookup table has no LBA for assigning the target sector for the writing in response to the writing command as a result of searching the lookup table, step S115 of adding the LBA for assigning the target sector to the lookup table is performed. At this time, the number of writing times for the LBA newly added to the lookup table is initialized with "1."

Instead of individually adding the LBA to the lookup table, in this manner, at an initial writing operation of the target sector, all LBAs may be previously stored in the lookup table. However, the foregoing method according to this embodiment is preferable in light of reducing the size of the lookup table.

On the other hand, if the lookup table has the LBA for assigning the target sector as a result of searching the lookup table, step S120 of determining whether the number of writing times of the LBA for assigning the target sector exceeds the limited number of writing times, is predetermined. Here, the "predetermined writing times" means the number of writing times at which it is estimated that the data may be lost due to the ATE phenomenon, and which can be experimentally set up.

Then, if the number of writing times of the LBA for assigning the target sector does not exceed the limited number of writing times as a result of determination in the step S120, step S130 of increasing the number of writing times of the LBA for assigning the target sector by one in the lookup table is performed.

At this time, the increased number of writing times is not instantly reflected in the lookup table stored in the maintenance cylinder of the disk, but reflected in the lookup table uploaded to the buffer 180 (FIG. 2) so that the lookup table stored in the maintenance cylinder can be updated with the lookup table uploaded to the buffer 180 (FIG. 2) when the hard disk drive enters an idle time mode or is powered off, for example.

On the other hand, if the number of writing times of the LBA for assigning the target sector exceeds the limited number of writing times as a result of determination in the step S120, step S140 of relocating the data is performed.

In the step S140 of relocating the data, the data written in the target sector is moved to an allocated sector included in a previously allocated zone. Here, the "previously allocated zone" is set up as a zone having a TPI lower than the average TPI of the disk, and the 'allocated sector' is one of the sectors included in the previously allocated zone.

For example, the 'previously allocated zone' may be set up as the whole or a part of the zone having the lowest TPI among a plurality of zones on the disk. Here, the 'zone' is a group of adjacent tracks concentrically positioned on the disk. In general, a zone mapping operation for dividing the surface of the disk into the plurality of zones is performed before a read channel optimizing (RCO) operation is performed.

The lower the TPI of the zone, the larger the width of the track included in the zone. Therefore, if the zone having the lowest TPI is set up as the previously allocated zone, the allocated sector included in the previously allocated zone has wider track width than that of the target sector.

For example, "A" in FIG. 4 indicates the target sector assigned by the LBA of which the number of writing times exceeds the limited number of writing times, and 'B' indicates the allocated sector included in the previously allocated zone. Referring to FIG. 4, the track width $W_2$ of the allocated sector B is larger than the track width $W_1$ of the target sector A.

In the meantime, the 'allocated sector' may be set up as a preliminary sector not used in writing data before performing the foregoing step 140 of relocating the data. Alternatively, the 'allocated sector' may be set up to be used in writing data like other general sectors even before performing the foregoing step 140 of relocating the data.

If the allocated sector is set up to be used in writing data like other general sectors even before performing the step 140 of relocating the data, the step S140 of relocating the data includes moving the data written in the target sector to the allocated sector and also moving the data written in the allocated sector to the target sector since the data may be written in the allocated sector. In other words, the data written in the target sector is interchanged with the data written in the allocated sector.

When the step 140 of relocating the data is completed, the step S150 of rearranging the LBA to interchange the LBA for assigning the target sector with the LBA for assigning the allocated sector, is performed. In the step S150 of rearranging the LBA, the LBA assigning the target sector is changed to assign the allocated sector, and the LBA assigning the allocated sector is changed to assign the target sector.

Thus, in the step S150 of rearranging the LBA, the LBA for assigning the target sector is interchanged with the LBA for assigning the allocated sector so that the magnetic head can move to a right position of the assigned sector according to the rearranged LBA at the next writing or reading operation.

As described above, in the method for preserving data in the hard disk drive in this embodiment, data written in a zone where the ATE phenomenon is likely to occur since frequency of use is high, is relocated to another zone having a low TPI when writing the data in a disk.

Specifically, the method for preserving data in the hard disk drive according to the exemplary embodiment moves the data written in the target sector to the allocated sector, and interchanges the LBA assigning the target sector with the LBA assigning the allocated sector if the number of writing times of the LBA for assigning the target sector for writing in response to the writing command exceeds the predetermined number of writing times. At this time, the allocated sector is included in a zone having a TPI lower than the average TPI, and preferably, in a zone having the lowest TPI on the disk.

As described above, according to the exemplary embodiment, data loss due to adjacent track erase (ATE) phenomenon is minimized by relocating data, which is written in a zone where the ATE phenomenon is likely to occur since frequency of use is high, to another zone having a low TPI when writing the data in a disk.

While the exemplary embodiment has been particularly shown and described, it will be understood that various changes in form and details may be made therein without departing from the spirit and scope of the exemplary embodiments as set forth in the following claims.

What is claimed is:

1. A method comprising:
   determining a number of write times a target sector is recorded;
   relocating data from the target sector to a second sector if the number of write times of the target sector exceeds a predetermined number; and
   wherein the second sector is in a second zone having a second data storage density that is lower than a first data storage density of a first zone containing the target sector.

2. The method according to claim 1, wherein the second zone is set up as a whole zone or a part of a zone having a lowest TPI among a plurality of zones on a disk.

3. The method according to claim 1, wherein the second sector includes a track width that is larger than a track width of the target sector.

4. The method according to claim 1, further comprising increasing the number of write times of a logical block address (LBA) of the target sector by one in a lookup table when the number of write times of the LBA for assigning the target sector does not exceed the predetermined number.

5. The method according to claim 4, further comprising adding the LBA of the target sector to the lookup table when the lookup table does not include the LBA of the target sector.

6. A method comprising:
   receiving a write command;
   searching a lookup table where a number of writes to a logical block address (LBA) of a target sector is recorded, when receiving the writing command;
   relocating data from the target sector to a different sector if the number of writes of the LBA of the target sector exceeds a predetermined number of writes, the relocating including moving data written in the target sector to the different sector, and moving data written in the different sector to the target sector; and
   rearranging the LBA by interchanging the LBA of the target sector with the LBA of the different sector.

7. The method according to claim 4, wherein the lookup table is stored in a disk and uploaded from the disk to a buffer.

8. An apparatus comprising:
   a host interface adapted to receive a write command from a host;
   a lookup table indicating a number of writes to a first sector of a data storage medium;
   a controller adapted to search the lookup table when receiving a write command, relocate data to move data written in the first sector to a second sector when the number of writes of the first sector exceeds a predetermined number of writes, the second sector is in a second zone having a second data storage density that is lower than a first data storage density of a first zone containing the first sector, and interchange a logical block address (LBA) of the first sector with an LBA of the second sector.

9. The apparatus of claim 8, wherein the second sector is included in a zone having a track per inch (TPI) lower than an average TPI on the data storage medium.

10. The apparatus of claim 9, wherein the zone is at least part of a zone having a lowest TPI among a plurality of zones on the data storage medium.

11. The apparatus of claim 9, wherein the data storage medium comprises a track-based data storage medium and the second sector includes a track width that is larger than a track width of the first sector.

12. The apparatus of claim 8, wherein the controller increases the number of writes associated with the first sector by one when the number of writes associated with the first sector does not exceed the predetermined number of writes.

13. The apparatus of claim 8, wherein the controller adds a reference for the first sector to the lookup table when the lookup table does not include a reference for the first sector.

14. The apparatus of claim 8, wherein the controller moves data written in the first sector to the second sector, and moves data written in the second sector to the first sector when the number of writes of the first sector exceeds the predetermined number of writes.

15. The apparatus of claim 8, wherein the lookup table is stored in a disk data storage medium and uploaded to a buffer where the controller searches the lookup table.

16. The method of claim 6, further comprising moving data written in the target sector to the different sector and moving data written in the different sector to the target sector when the number of writes of the target sector exceeds the predetermined number of writes.

17. The method of claim 6, wherein the different sector is in a zone of the data storage medium having a data storage density that is lower than a data storage density of a zone containing the target sector.

18. The method of claim 6, wherein the data storage medium is a track-based data storage medium and the different sector is in a zone having a track per inch (TPI) lower than an average TPI of the data storage medium.

19. The method of claim 6, wherein the data storage medium is a track-based data storage medium and the different sector is within a track having a track width that is larger than a track width of a track containing the target sector.

* * * * *